J. WHITE.
DIVIDERS.
APPLICATION FILED FEB. 2, 1918.
1,269,027.
Patented June 11, 1918.
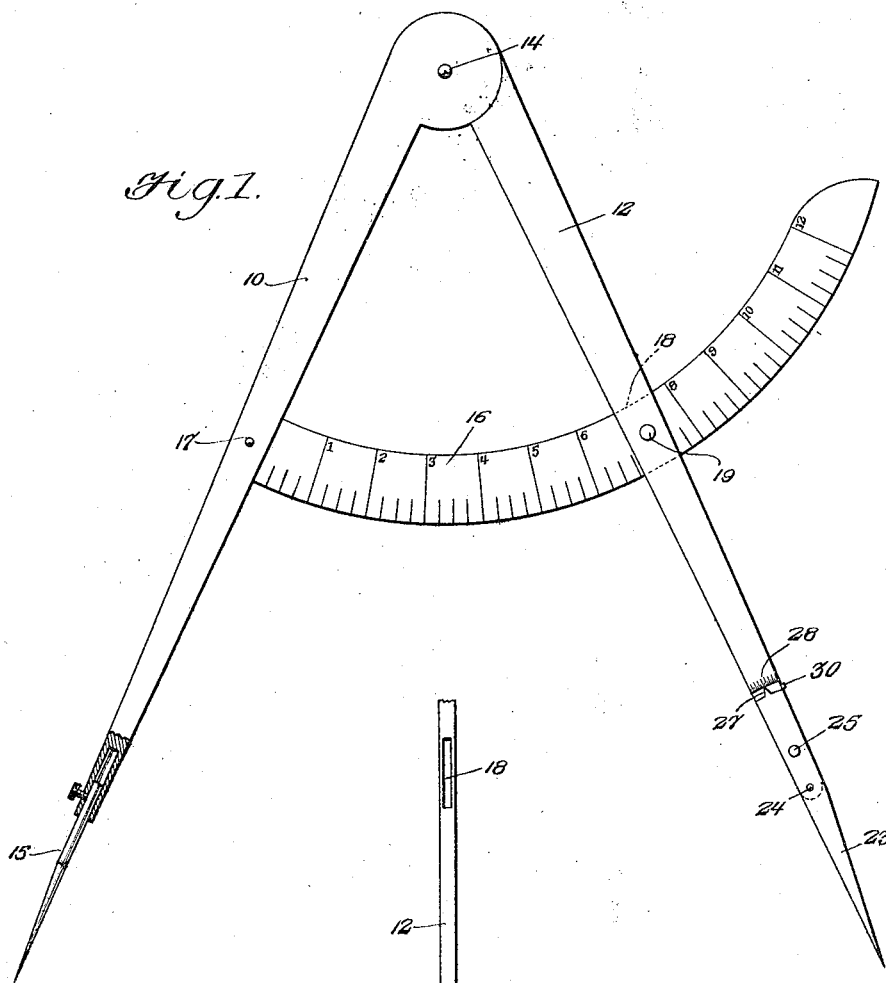
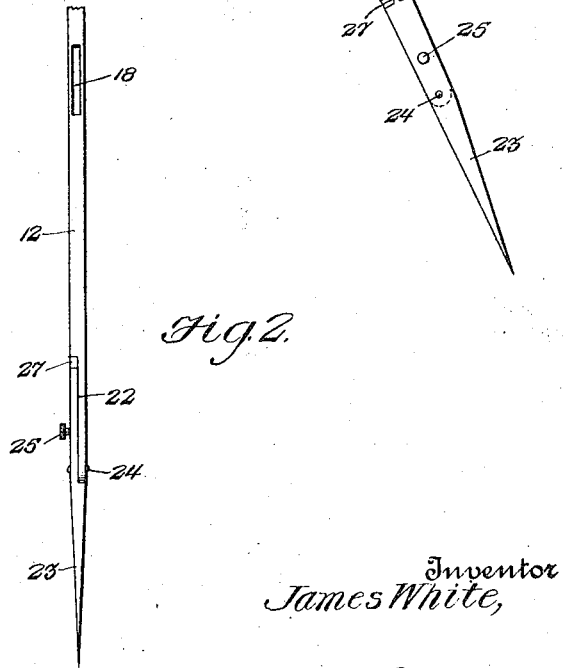
Inventor
James White,
By Victor J. Evans
Attorney
Witnesses
J H Crawford
E. M. Springer

UNITED STATES PATENT OFFICE.

JAMES WHITE, OF TAMPA, FLORIDA.

DIVIDERS.

1,269,027.   Specification of Letters Patent.   Patented June 11, 1918.

Application filed February 2, 1918.   Serial No. 215,112.

*To all whom it may concern:*

Be it known that I, JAMES WHITE, a citizen of the United States, residing at Tampa, in the county of Hillsboro and State of Florida, have invented new and useful Improvements in Dividers, of which the following is a specification.

This invention relates to dividers, and one object is to provide an instrument of the type indicated having a main scale plate divided into inches and certain fractions such as halves and quarters, one leg member of the instrument being provided with an adjustable member coöperating with a scale graduated to indicate other fractions such as eighths and sixteenths.

A still further object is to provide in connection with an instrument of the type indicated a leg member having an adjustable end or foot portion which may be adjusted for the purpose of taking up wear.

With the foregoing and other objects in view, the invention consists in the novel construction, combination and arrangement of elements hereinafter described and claimed.

In the drawings:

Figure 1 is a view in elevation,

Fig. 2 is an elevation from another angle, of one of the leg members.

The leg members of the instrument are designated 10 and 12 and are pivotally connected at 14, member 10 being provided with an adjustable end or foot member 15 by means of which any variation in the length of the leg as a whole due to wear may be compensated for.

A segmental scale plate 16 is pivotally connected at 17 with leg member 10 and passes through a slot 18 in leg 12, being retained in adjusted position by a screw 19. This scale member 16 is graduated to indicate inches and certain fractions thereof, preferably halves and quarters as shown in the drawings. The scale may be of such length that twelve inch measurements between the ends of the legs will be provided for.

The leg member 12 is cut away at its lower end as shown at 22 and serves to pivotally mount an extension or foot member 23, the latter being connected with the main portion of the leg by a pivot 24. The member 23 is correspondingly cut away and is retained in any desired position by means of a clamping screw 25. Member 23 carries at its upper end a pointer 27 coöperating with a scale 28 indicating eighths and sixteenths of an inch.

This instrument is designed for the use of carpenters and all other mechanics requiring a device of the type indicated, and in making somewhat rough measurements the main scale plate affords sufficient accuracy, and makes it possible to employ the device instead of a carpenter's rule. In making more accurate adjustment the scale 28 is employed in the manner set forth. It should be added that a guide or stop member 30 is located as shown and limits the movement of the pivoted foot member 23.

What is claimed is:

1. In a device of the class described, a plurality of leg members pivotally connected, a scale member pivotally connected with one of the leg members and slidable with reference to the other of said members, an adjustable foot member carried by one of the leg members, a pivotally mounted foot member carried by the other leg member and mounted to swing in a plane parallel with the plane of movement of said leg members, one of the leg members having a scale thereon, and a pointer carried by the pivoted member last named and coöperating with the scale last mentioned.

2. In a device of the class described, a plurality of leg members pivotally connected, a foot member adjustable with reference to one of the leg members, an arc shaped scale connected with one of the leg members and coöperating with the other of said members, a pivotally mounted foot member carried by one of the leg members, a pointer on the upper end of said foot member, the adjacent leg member having a scale extending transversely with reference thereto, and a stop member for limiting the movement of the pivoted foot member.

3. In a device of the class described, a plurality of pivotally connected leg members, a main arc shaped scale member connected therewith, one of the leg members being cut away near its lower end, a foot member correspondingly cut away and pivotally connected with said leg member last named, a clamping screw for retaining said foot member in adjusted position, the leg member last named having a scale extending transversely with reference thereto, and means movable with the pivoted foot member for coöperation with the scale last named.

In testimony whereof I affix my signature.

JAMES WHITE.

Copies of this patent may be obtained for five cents each, by addressing the "Commissioner of Patents, Washington, D. C."